United States Patent
Koda

(10) Patent No.: US 10,268,488 B2
(45) Date of Patent: Apr. 23, 2019

(54) IMAGE FORMING APPARATUS CAPABLE OF EASY APPLICATION CREATION

(71) Applicant: KYOCERA Document Solutions Inc., Osaka (JP)

(72) Inventor: Shinya Koda, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 69 days.

(21) Appl. No.: 15/454,382

(22) Filed: Mar. 9, 2017

(65) Prior Publication Data
US 2017/0286138 A1 Oct. 5, 2017

(30) Foreign Application Priority Data
Mar. 31, 2016 (JP) ................................. 2016-072703

(51) Int. Cl.
*G06F 21/62* (2013.01)
*G06F 9/445* (2018.01)

(52) U.S. Cl.
CPC ...... *G06F 9/44526* (2013.01); *G06F 21/6281* (2013.01)

(58) Field of Classification Search
CPC .................... G06F 9/44526; G06F 21/6281
See application file for complete search history.

(56) References Cited

U.S. PATENT DOCUMENTS

| | | | | |
|---|---|---|---|---|
| 6,263,498 B1* | 7/2001 | Alcorn | ..................... | G06F 9/465 717/110 |
| 6,314,429 B1* | 11/2001 | Simser | ..................... | G06F 8/51 707/801 |
| 8,782,744 B1* | 7/2014 | Fuller | ..................... | G06F 21/52 709/225 |
| 9,131,094 B2 | 9/2015 | Araki | | |
| 2003/0181193 A1* | 9/2003 | Wilhelmsson | .......... | G06F 9/545 455/403 |
| 2004/0127190 A1* | 7/2004 | Hansson | ................. | G06F 9/468 455/403 |
| 2007/0027663 A1* | 2/2007 | Cox | ........................ | G06N 7/005 703/2 |
| 2008/0244685 A1* | 10/2008 | Andersson | .............. | G06F 21/53 726/1 |
| 2015/0002874 A1 | 1/2015 | Araki | | |

FOREIGN PATENT DOCUMENTS

JP 2015-011518 A 1/2015

* cited by examiner

*Primary Examiner* — Viva Miller
(74) *Attorney, Agent, or Firm* — IP Business Solutions, LLC

(57) ABSTRACT

An electronic device includes: a central processing unit (CPU), and a storage device. The storage device includes: a first application; an add-on including: a first programming portion configured in a first programming language and a second programming portion configured in a second programming language and called by the first programming portion; and a second application using the add-on. The CPU determines, based on authentication information associated with the add-on, whether or not the call of the second programming portion by the first programming portion is permitted, and upon determination that the call is permitted, provides the add-on with a right of the call.

8 Claims, 12 Drawing Sheets

IMAGE FORMING APPARATUS CAPABLE OF EASY APPLICATION CREATION

INCORPORATION BY REFERENCE

This application claims priority to Japanese Patent Application No. 2016-072703 filed on 31 Mar. 2016, the entire contents of which are incorporated by reference herein.

BACKGROUND

A typical electronic device has conventionally been known which is capable of installing an application configured in a Java (registered trademark) language (hereinafter referred to as "Java application"). The typical electronic device is normally required to perform authentication for each Java application, which therefore requires great labor for creation of the Java application.

SUMMARY

This disclosure relates to an electronic device capable of easy Java application creation.

According to one aspect of this disclosure, an electronic device includes a central processing unit (CPU), and a storage device.

The storage device includes: a first application; an add-on that includes (i) a first programming portion configured in a first programming language and (ii) a second programming portion configured in a second programming language and called by the first programming portion; and a second application using the add-on.

The CPU determines, based on authentication information associated with the add-on, whether or not a call of the second programming portion by the first programming portion is permitted, and when determining that the call is permitted, provides the add-on with a right of the call.

DETAILED DESCRIPTION

A Java application operates under Java virtual environment, thus making it easy to control, for example, a usable application program interface (API) and usable memory capacity. Thus, an electronic device has low possibility that operation unexpected by a producer of the electronic device is executed by the Java application even upon installation thereof, resulting in low possibility that any security-related problem occurs.

A process performed under the Java virtual environment requires a high load, and thus a process of a program configured in a Java language is performed at a low speed in some cases. Thus, the Java is provided with a mechanism called a Java native interface (JNI) capable of calling a program (hereinafter referred to as "native program") configured in a native language, such as C++, which operates directly on an operating system (OS), and is used for increasing a process speed and calling a library configured in the native language.

The native language can freely use functions provided by the OS. Thus, for example, the native program can be read out and written for a given file in the electronic device. Therefore, the electronic device has high possibility that the operation unexpected by the producer of the electronic device is executed by the native program, thus resulting in high possibility that the security-related problem arises.

Hereinafter, embodiments of the present disclosure will be described with reference to the drawings.

First Embodiment

First, a configuration of a multifunction peripheral (MFP) as an electronic device according to the first embodiment of the disclosure will be described.

Figure 1:
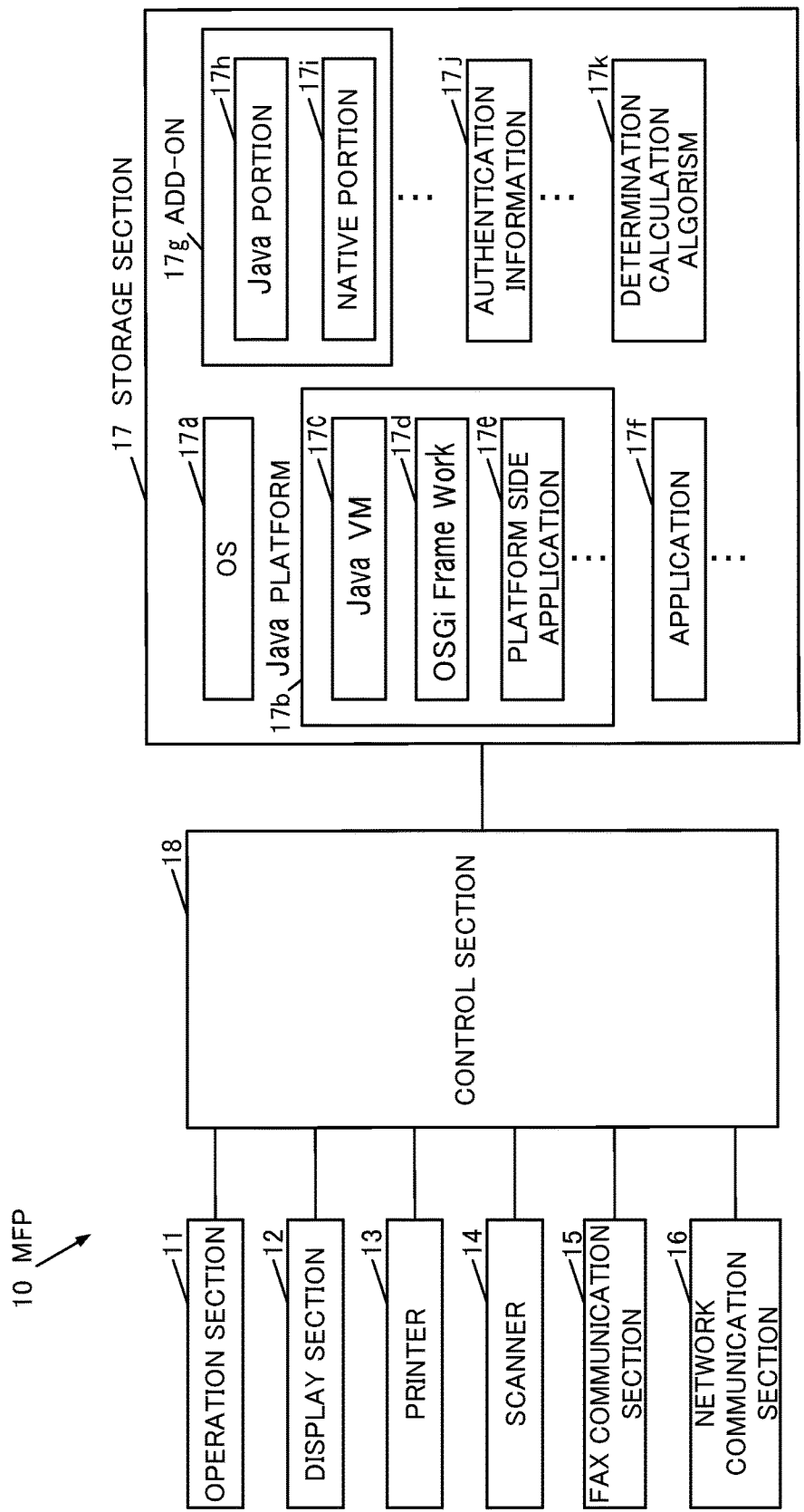
FIG. 1 is a block diagram of an MFP according to a first embodiment of the present disclosure.

FIG. 1 is a block diagram of an MFP 10 according to the present embodiment.

As illustrated in FIG. 1, the MFP 10 includes: an operation section 11 as an input device, such as buttons, through which various kinds of operation are inputted; a display section 12 as a display device, such as a liquid crystal display (LCD), which displays various pieces of information; a printer 13 as a printing device which executes printing on a recording medium such as paper; a scanner 14 as a reading device which reads an images from a document; a fax communication section 15 as a fax device which performs fax communication with an external facsimile device, not illustrated, via a communication line such as a public phone line; a neatwork communication section 16 as a network communication device which performs communication with an external device via a network such as a local area network (LAN) or the Internet; a storage section 17 as a non-volatile storage device, such as a semiconductor memory or a hard disk drive (HDD), which stores various pieces of information; and a control section 18 which controls the entire MFP 10.

Figure 2:
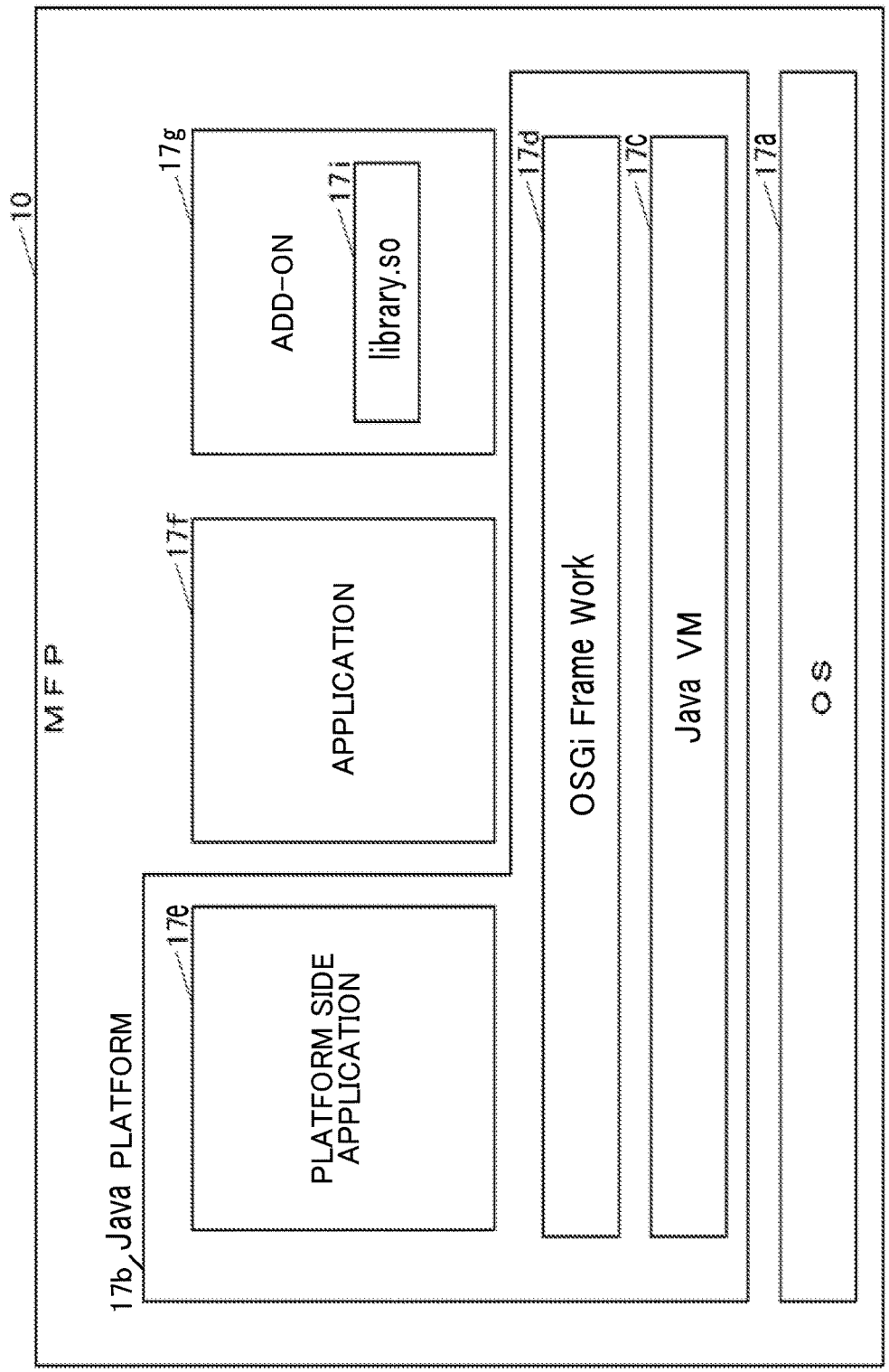
FIG. 2 is a diagram illustrating a software configuration of the MFP illustrated in FIG. 1.

FIG. 2 is a diagram illustrating a software configuration of the MFP 10.

As illustrated in FIGS. 1 and 2, the storage section 17 stores: an operating system (OS) 17a; and a Java platform 17b which operates on the OS 17a. The Java platform 17b includes: a Java virtual machine (VM) 17c which operates on the OS 17a; an open service gateway initiative (OSGi) Frame Work 17d which operates on the Java VM 17c; and at least one platform side application 17e as a Java application which operates on the OSGi Frame Work 17d.

The storage section 17 is capable of storing at least one application 17f as a Java application which operates on the OSGi Frame Work 17d. The application 17f may be installed in the MFP 10 at a stage of production of the MFP 10, may additionally be installed in the MFP 10 from an external recording medium such as an SD card or a universal serial bus (USB) memory, or may additionally be installed in the MFP 10 from the network.

The storage section 17 is capable of storing at least one add-on 17g which operates on the OSGi Frame Work 17d and which is used by at least one application 17f. The add-on 17g includes: a Java portion 17h as a first programming portion which is configured in a Java language as a first programming language; and a native portion 17i as a second programming portion which is configured in a native language as a second programming language different from the Java language and which is called by the Java portion 17h.

The native portion 17i is illustrated as "library. so" in FIG. 2. The add-on 17g may be installed in the MFP 10 at the stage of production of the MFP 10, may additionally be installed in the MFP 10 from an external recording medium such as an SD card or a USB memory, or may additionally be installed in the MFP 10 from the network.

The storage section 17 is capable of storing, for each add-on 17g, authentication information 17j indicating that the add-on 17g has been authenticated.

The storage section 17 stores a determination calculation algorism 17k which is used for determining whether or not a call of the native portion 17i by the Java portion 17h is permitted.

The control section 18 includes: for example, a central processing unit (CPU); a read only memory (ROM) which stores programs and various pieces of data; and a random access memory (RAM) which is used as a working area of the CPU. The CPU executes a program stored in the storage section 17 or the ROM.

Note that the Java language can more easily limit functions than the native language. On the other hand, the native language can be processed at a higher speed than the Java language.

For the application 17f, for the purpose of protecting a program (hereinafter referred to as "main function program"), not illustrated, which forms main functions of the MFP 10, such as printing, copying, faxing, and scanning, information such as setting information for the main function program and secret information which is held by the main function program, and hardware of the MFP 10, use thereof may at least partially be limited by the Java platform 17b.

The description below will be given on the assumption that the native language is C++.

Next, creation of the add-on 17g will be described.

Figure 3:
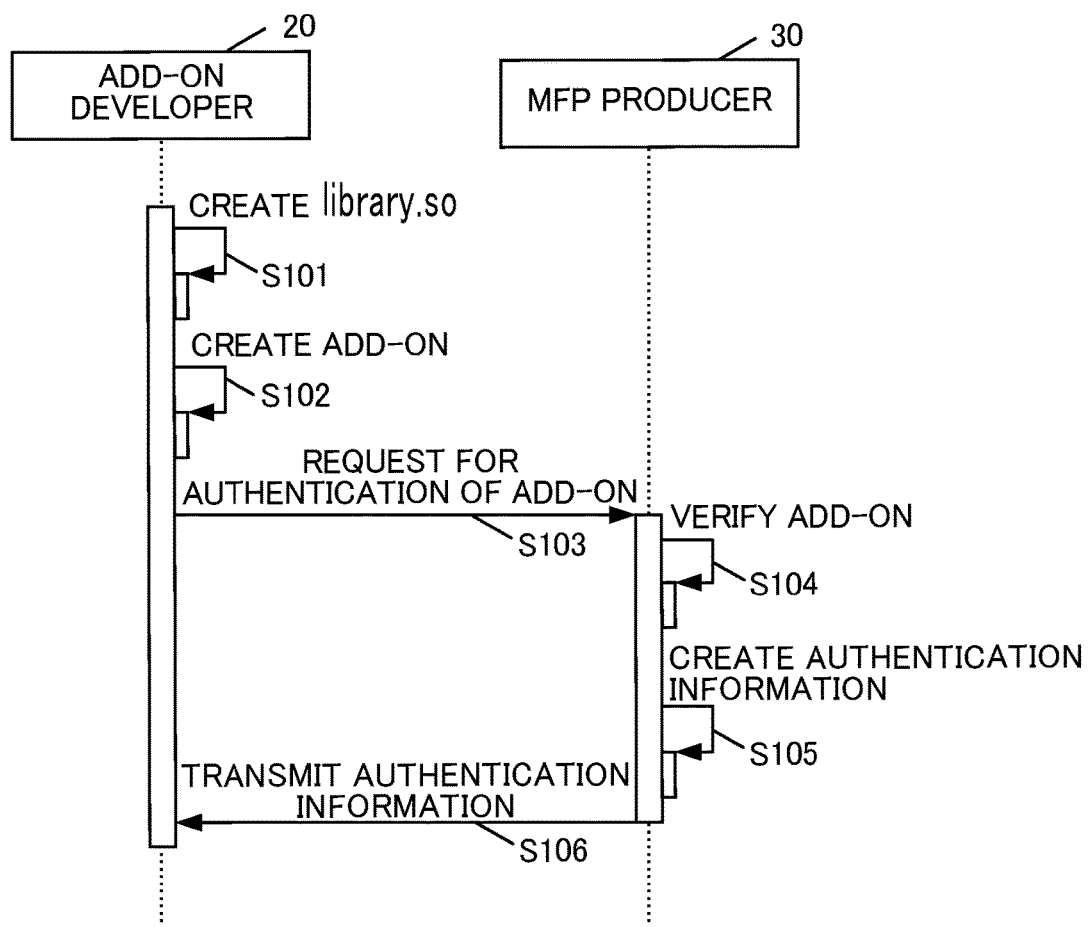
FIG. 3 is a sequence diagram of creation of an add-on illustrated in FIG. 1.

FIG. 3 is a sequence diagram of the creation of the add-on 17g.

As illustrated in FIG. 3, a developer (hereinafter referred to as "add-on developer") 20 of the add-on 17g sets, in the C++, a portion to be executed in the native by the MFP 10, and creates a file ". so format" (hereinafter referred to as "library. so") as a library (S101).

Next, the add-on developer 20 creates the add-on 17g which includes: the library. so created in S101, that is, the native portion 17i and the Java portion 17h including a command for loading the library. so (S102).

Next, the add-on developer 20 requests a producer 30 of the MFP 10 (hereinafter referred to as "MFP producer") for authentication of the add-on 17g created in S102 (S103).

The MFP producer 30, in response to the request made in S103, verifies the add-on 17g authentication of which has been requested, the library. so included in the add-on 17g in particular (S104).

Upon determination that there is no problem with the verification performed in S104, the MFP producer 30 creates the authentication information 17j from the library. so based on a specific calculation algorism (S105), and transmits the authentication information 17j to the add-on developer 20 (S106). Here, the calculation algorism has the same contents as those of the determination calculation algorism 17k.

Next, creation of the application 17f will be described.

A developer of the application 17f (hereinafter referred to as "application developer) creates the application 17f which uses the add-on 17g created in S102.

Next, operation performed by the MFP 10 will be described.

The application 17f created by the application developer is installed in the MFP 10. In the MFP 10, the add-on 17g created by the add-on developer 20 is also installed, and the authentication information 17j created by the MFP producer 30 in association with the add-on 17g is stored into the storage section 17.

First, operation performed by the MFP 10 upon installation of (when installing) the add-on 17g will be described.

Figure 4:
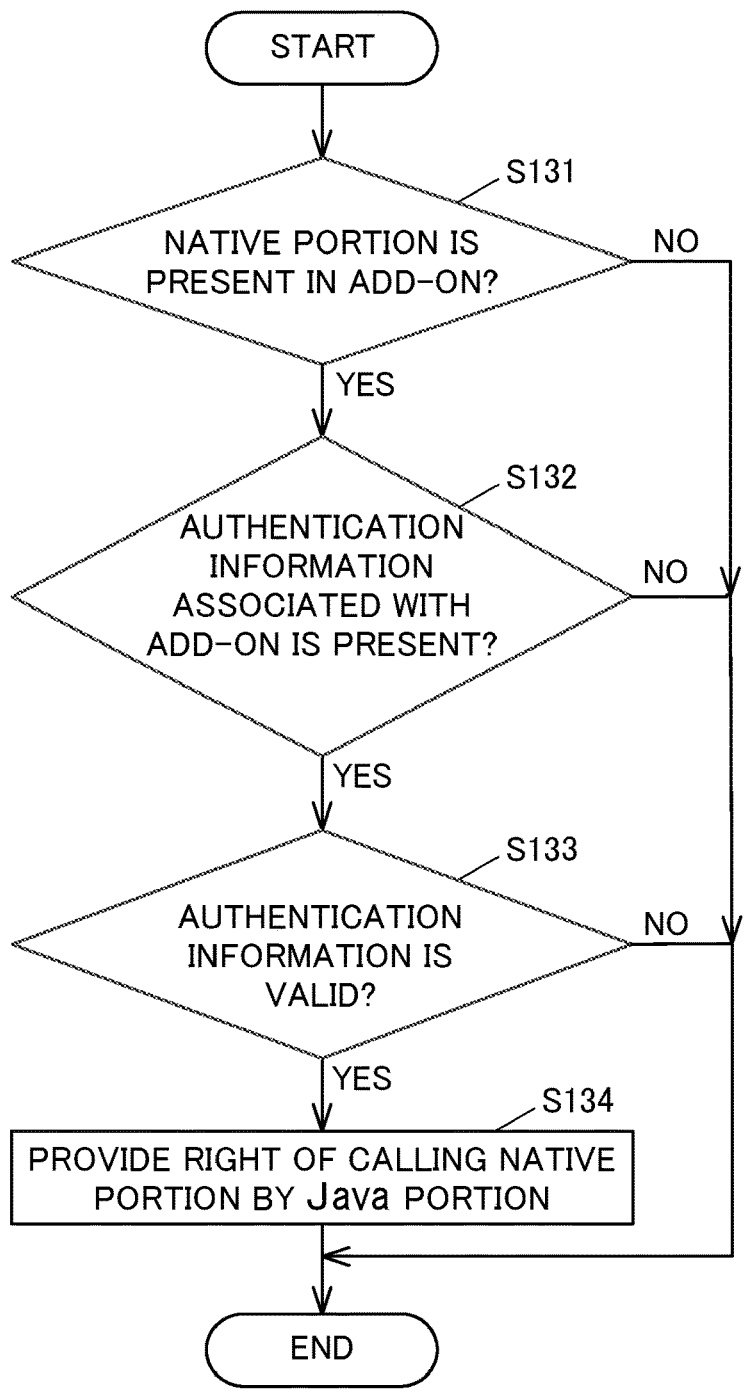
FIG. 4 is a flowchart of operation performed by the MFP illustrated in FIG. 1 upon add-on installation.
Figure 5:
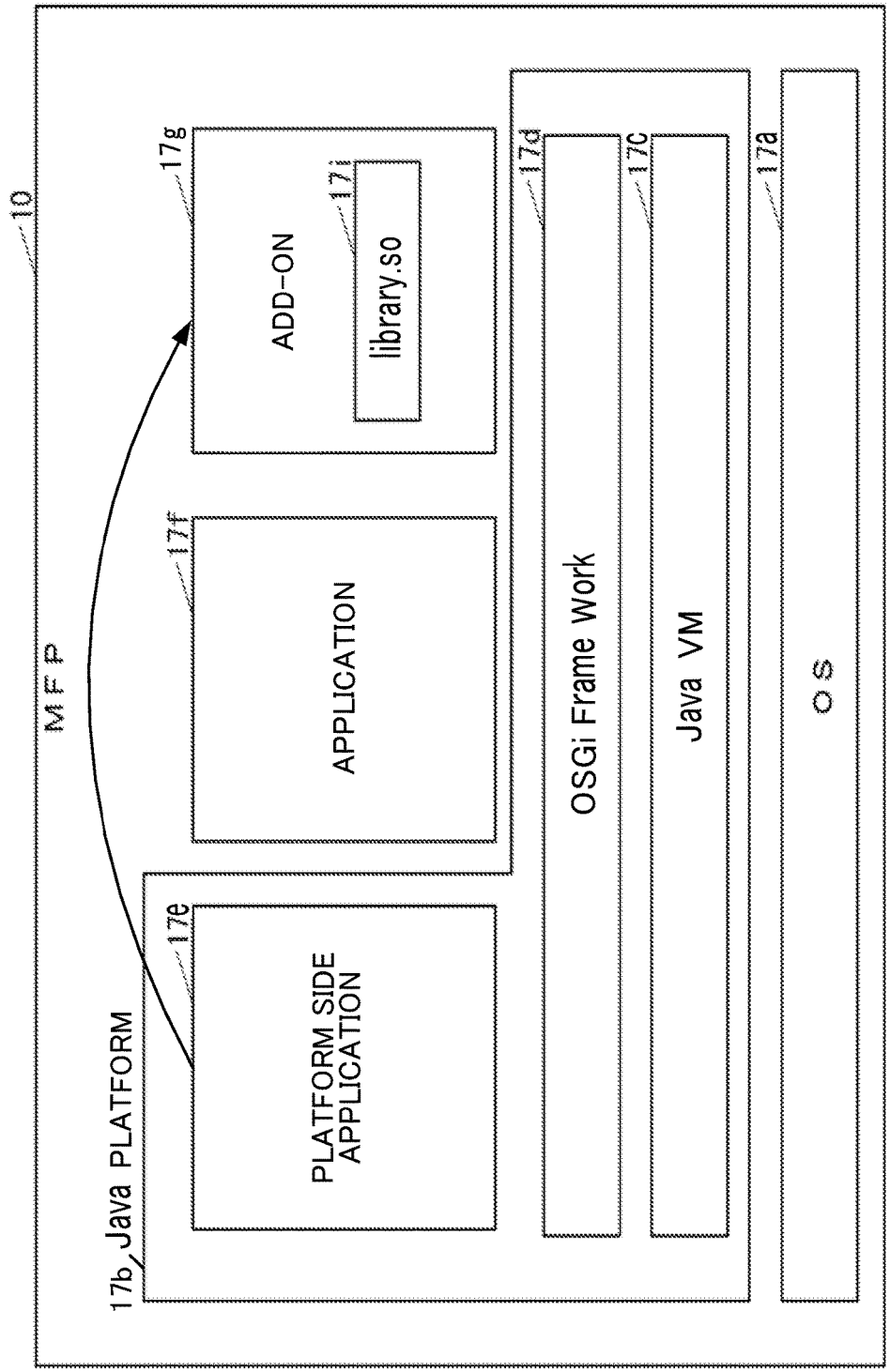
FIG. 5 is a diagram illustrating a software configuration of the MFP illustrated in FIG. 1 upon the add-on installation.

FIG. 4 is a flowchart of the operation performed by the MFP 10 upon the installation of the add-on 17g. FIG. 5 is a diagram illustrating a software configuration of the MFP 10 upon the installation of the add-on 17g.

As illustrated in FIGS. 4 and 5, the control section 18 executes the platform side application 17e to thereby determine whether or not the library. so as the native portion 17i is present in the installed add-on 17g (S131).

Upon determination (when determining) in S131 that the library. so is present, the control section 18 operates in accordance with the platform side application 17e to thereby determine whether or not the authentication information 17j associated with the add-on 17g is present (S132).

Upon determination (when determining) in S132 that the authentication information 17j is present, the control section 18 operates in accordance with the platform side application 17e to thereby determine whether or not the authentication information 17j is valid, that is, whether or not the call of the native portion 17i by the Java portion 17h is permitted (S133). Here, upon agreement between information created from the library. so of the installed add-on 17g based on the determination calculation algorism 17k and the authentication information 17j associated with the add-on 17g (when information created from the library. so of the installed add-on 17g based on the determination calculation algorism 17k is matched with the authentication information 17j associated with the add-on 17g), the control section 18 determines that the authentication information 17j is valid.

Upon the determination (when it is determined) in S133 that the authentication information 17j is valid, that is, the call of the native portion 17i by the Java portion 17h is permitted, the control section 18 provides the installed add-on 17g with a right of calling the native portion 17i by the Java portion 17h, that is, a right of loading the library. so as the native portion 17i in Java execution environment (S134).

Upon determination in S131 that no library. so is present, upon determination in S132 that no authentication information 17j is present, upon determination in S133 that the authentication information 17j is not valid, or upon execution a process of S134, the control section 18 ends the operation illustrated in FIG. 4.

Next, the operation performed by the MFP 10 upon execution of the application 17f by the control section 18 will be described.

First, the operation performed by the MFP 10 upon use of only functions provided by the Java by the application 17f where the functions provided by the Java and functions provided by the OS 17a are included will be described.

Note that the Java does not provide at least part of the functions, such as a function of accessing the storage section 17 and a function of executing stapling by an un-illustrated stapler upon printing performed by the printer 13 upon printing performed by the printer 13, which are all provided by the OS 17a.

Figure 6:
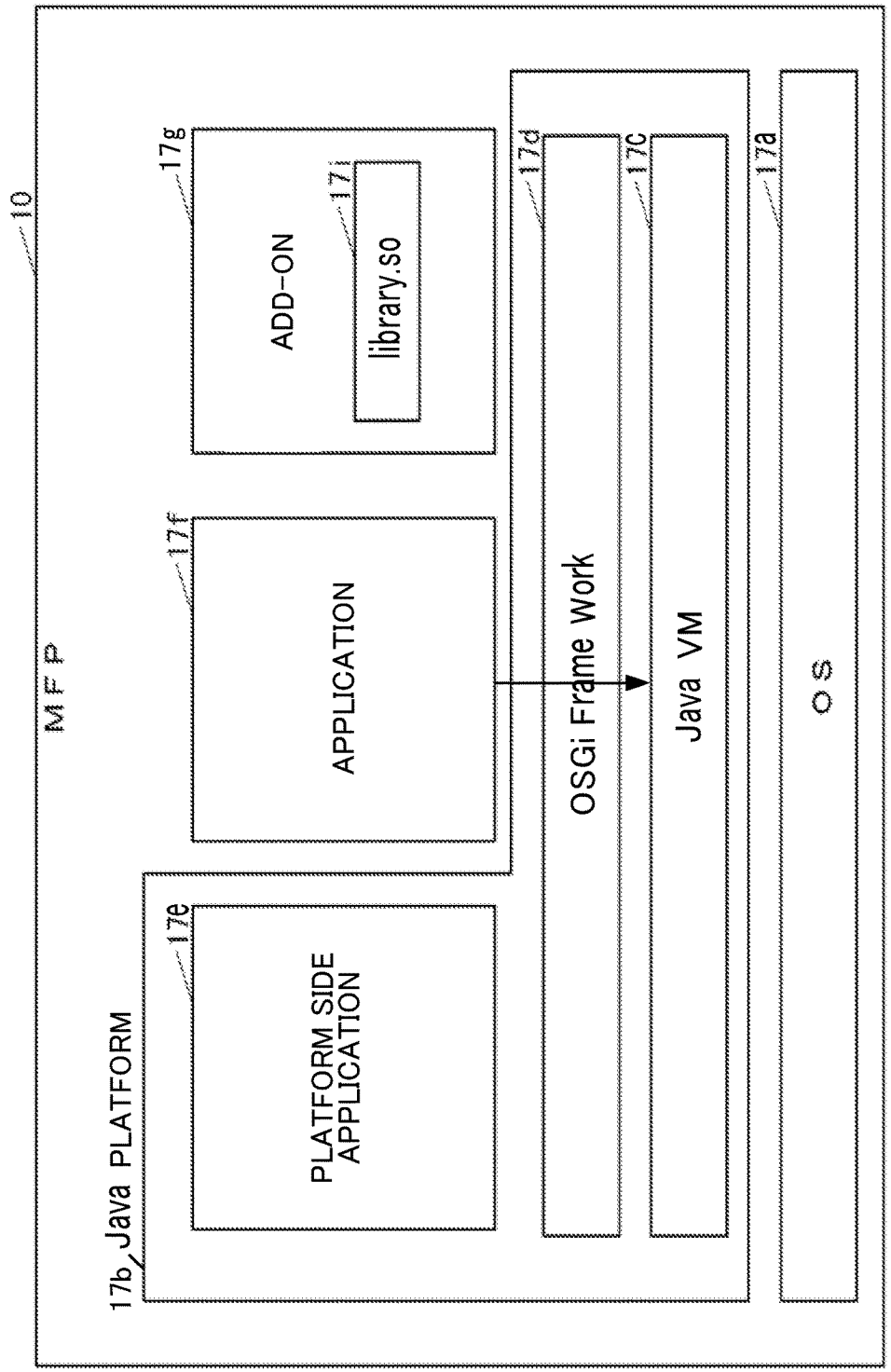
FIG. 6 is a diagram illustrating a software configuration of the MFP illustrated in FIG. 1 upon use of only functions provided by Java by an application where the functions provided by the Java and functions provided by an OS are included.

FIG. 6 is a diagram illustrating a software configuration of the MFP 10 upon use of only the functions provided by the Java by the application 17f where in the functions provided by the Java and the functions provided by the OS 17a are included.

As illustrated in FIG. 6, the control section 18 causes the application 17f to use only the functions provided by the Java where the functions provided by the Java and the functions provided by the OS 17a are included.

Next, operation performed by the MFP 10 upon the use of the functions provided by the OS 17a via the platform side application 17e by the application 17f will be described.

Figure 7:
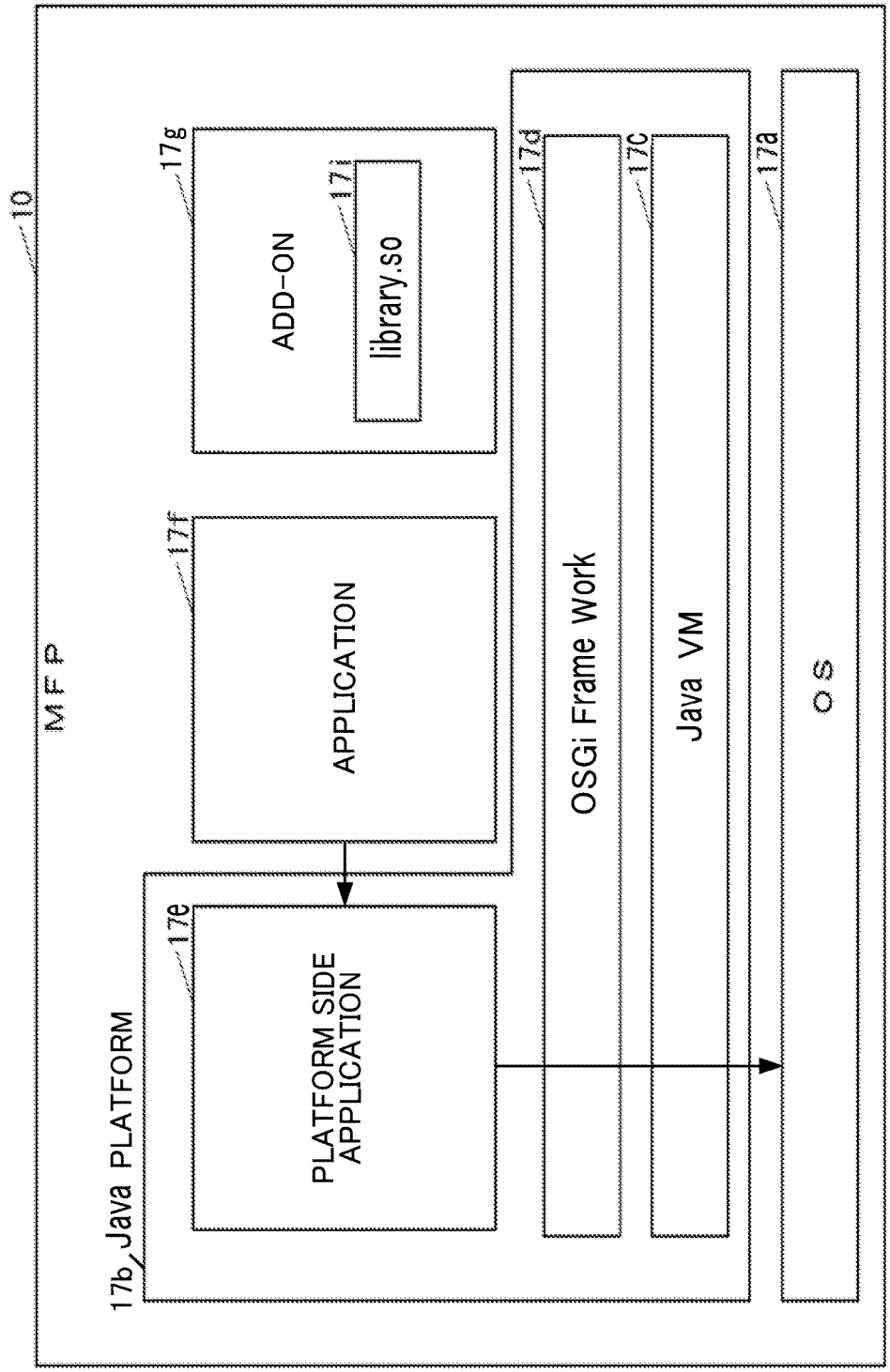
FIG. 7 is a diagram illustrating a software configuration of the MFP illustrated in FIG. 1 upon use of the functions provided by the OS via a platform side application by the application.

FIG. 7 is a diagram illustrating a software configuration of the MFP 10 upon the use of the functions provided by the OS 17a via the platform side application 17e by the application 17f.

As illustrated in FIG. 7, the control section 18 causes the application 17f to use the functions provided by the OS 17a via the platform side application 17e. The control section 18 operates in accordance with the platform side application 17e to thereby use the JNI for communication with the OS 17a. The control section 18 can also cause the application 17f to use the functions provided by the Java via the platform side application 17e.

Next, operation performed by the MFP 10 upon use of the functions provided by the OS 17a via the add-on 17g by the application 17f will be described.

Figure 8:
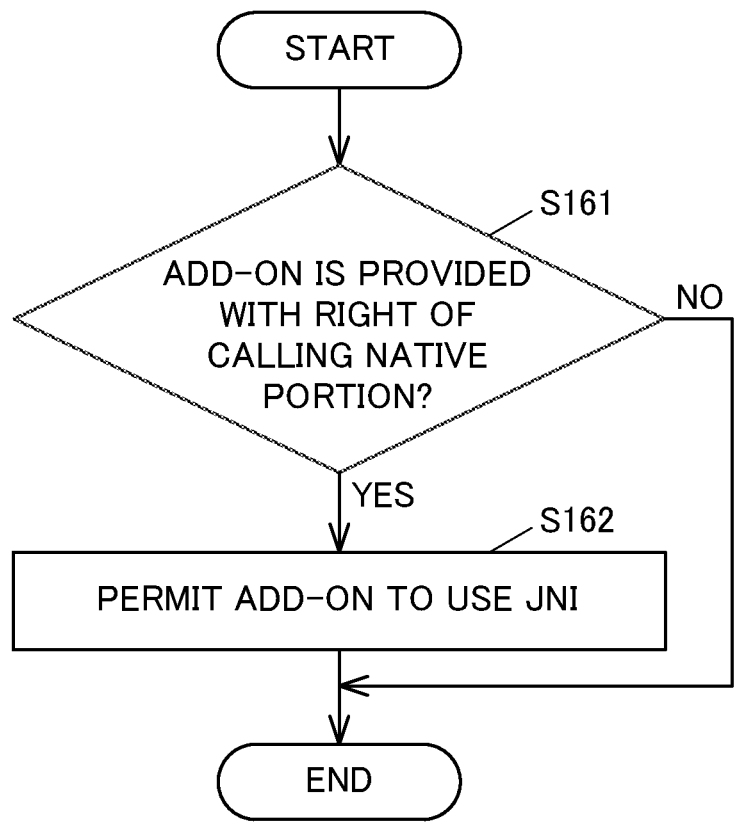
FIG. 8 is a flowchart of operation performed by the MFP illustrated in FIG. 1 upon use of the functions provided by the OS via the add-on by the application.
Figure 9:
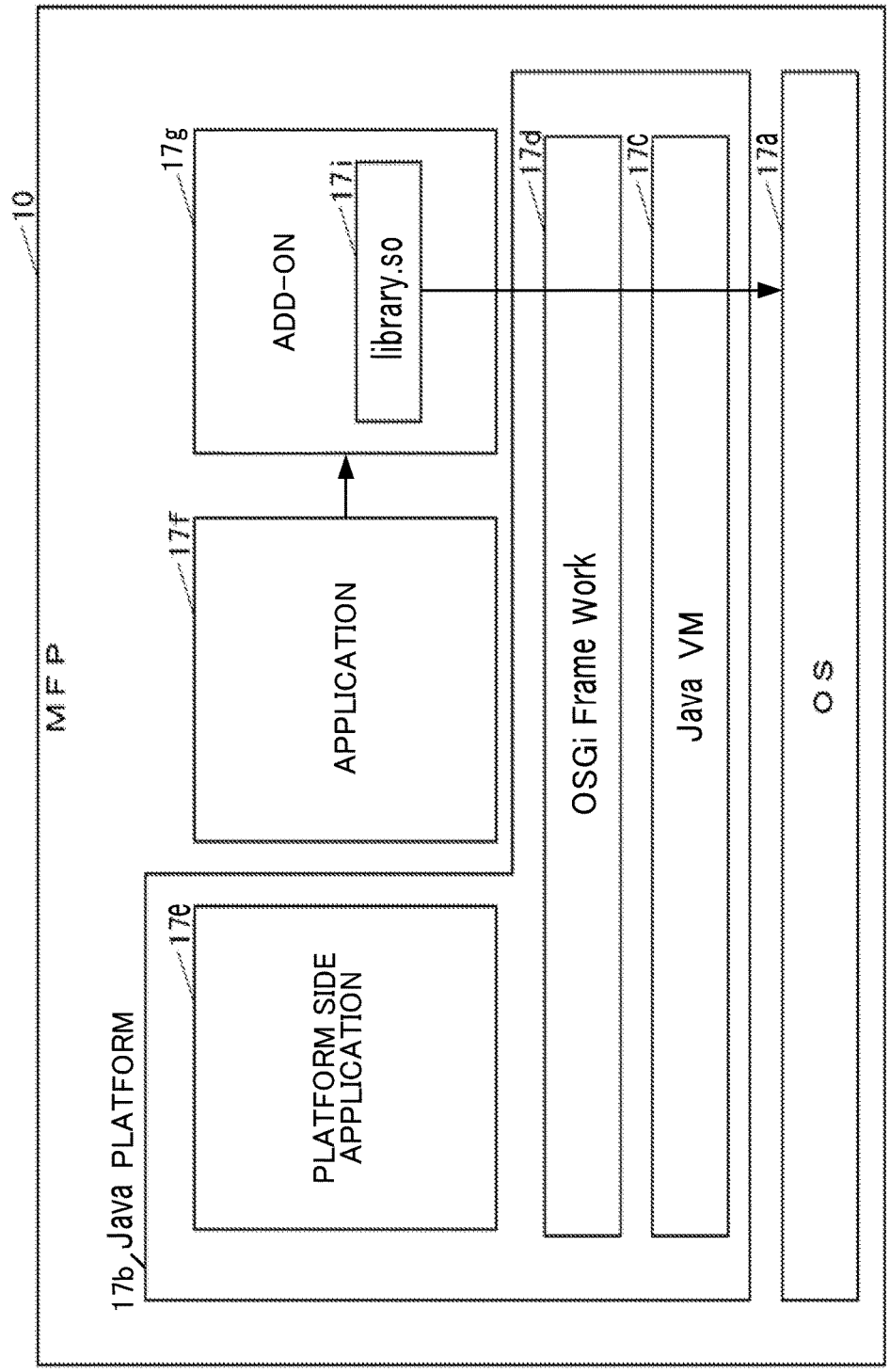
FIG. 9 is a diagram illustrating a software configuration of the MFP illustrated in FIG. 1 upon the use of the functions provided by the OS via the add-on by the application.

FIG. 8 is a flowchart of operation performed by the MFP 10 upon use of the functions provided by the OS 17a via the add-on 17g by the application 17f. FIG. 9 is a diagram illustrating a software configuration of the MFP 10 upon the use of the functions provided by the OS 17a via the add-on 17g by the application 17f.

As illustrated in FIG. 8, the control section 18 causes the Java platform 17b to determine whether or not the add-on 17g is provided with the right of calling the native portion 17i by the Java portion 17h, that is, the right of loading the library. so as the native portion 17i in the Java execution environment (S161).

Through execution of the Java platform 17b, the control section 18, upon determination (when determining) in S161 that the add-on 17g is provided with the right of calling the native portion 17i by the Java portion 17h, permits the add-on 17g to use the JNI (S162), ending the operation illustrated in FIG. 8. Therefore, the control section 18 can cause the add-on 17g to call the native portion 17i by the Java portion 17h, that is, can cause the add-on 17g to load the library. so as the native portion 17i in the Java execution environment. As a result, as illustrated in FIG. 9, the control section 18 causes the application 17f to use the functions provided by the OS 17a via the add-on 17g. The control section 18 causes the add-on 17g to use the JNI for the communication with the OS 17a. The control section 18 also can cause the application 17f to use functions provided by the Java via the add-on 17g.

Through the execution of the Java platform 17b, the control section 18, upon determination in S161 that the add-on 17g is not provided with the right of calling the native portion 17i by the Java portion 17h, does not permit the add-on 17g to use the JNI, ending the operation illustrated in FIG. 8.

In the MFP (electronic device) 10 according to one embodiment of this disclosure, upon determination (when determining) based on the authentication information 17j that the call of the native portion 17i by the Java portion 17h in the add-on 17g is permitted (YES in S133), the control section 18 provides the add-on 17g with the right of the call (S134), and the add-on 17g is used by the application 17f, thus requiring no association with the authentication information for each application 17f, which makes it easy to create the application 17f.

With the configuration such that the application 17f is provided with the right of calling the native portion by the Java portion in the application 17f, there is possibility that, upon installation of another application (hereinafter referred to as "another app") provided with the same identification information (for example, a file name) as that of the application 17f after the application 17f is provided with the right of calling the native portion by the Java portion, the call of the native portion by the Java portion in another app is permitted by mistake. However, in the MFP 10, the control section 18 provides the add-on 17g with the right of calling the native portion 17i by the Java portion 17h in the add-on 17g, which can therefore improve security performance for an illegal application 17f more than that with a configuration such that the application 17f is provided with the right of calling the native portion by the Java portion in the application 17f.

Note that the control section 18 maintains the right of calling the native portion 17i by the Java portion 17h even after the execution of the add-on 17g, thus requiring no determination based on the authentication information 17j upon every execution of the add-on 17g, which permits a high-speed call of the native portion 17i by the Java portion 17h.

In the MFP 10 according to one embodiment of this disclosure, the determination by the control section 18 of whether or not the call of the native portion 17i by the Java portion 17h is permitted is performed not upon the execution of the add-on 17g but upon the installation of the add-on 17g, which therefore permits high-speed execution of the add-on 17g. However, the MFP 10 may be configured in a manner such as to determine, not upon the installation of the add-on 17g but upon the initial execution of the add-on 17g, whether or not the call of the native portion 17i by the Java portion 17h is permitted.

In the MFP 10 according to the embodiment of this disclosure, upon agreement between the authentication information 17j and information created from the native portion 17i of the add-on 17g based on the determination calculation algorism 17k, the control section 18 determines that the call of the native portion 17i by the Java portion 17h is permitted. Therefore, even when there is high possibility that the authentication information 17j differs from one add-on 17g to another in the MFP 10, misappropriation of the authentication information 17j validly associated to the specific add-on 17g to another add-on 17g can be prevented, which permits an improvement in the security performance.

Moreover, as a result of storing, in the nonvolatile storage section 17, information indicating that the right of calling the native portion 17i by the Java portion 17h is provided, the control section 18 is not required to determine, upon every activation of the MFP 10, whether or not the call of the native portion 17i by the add-on 17g is permitted, which can therefore reduce process load. However, the MFP 10 may also be configured in a manner such as to store, into the RAM of the control section 18, the information indicating that the right of calling the native portion 17i by the Java portion 17h is provided and determine, upon every activation of the MFP 10, whether or not the call of the native portion 17i by the Java portion 17h is permitted.

Note that the authentication information 17j is associated with the add-on 17g and present as a different file from the add-on 17g in the present embodiment. However, the authentication information 17j may be included in a portion, other than the native portion 17i, included in the add-on 17g.

The MFP producer 30 verifies the entire add-on 17g including the library. so in the present embodiment. However, the MFP producer 30 may verify only the library. so. In a case where the MFP producer 30 verifies only the library. so, only the library. so included in the add-on 17g is required to be transmitted from the add-on developer 20 to the MFP producer 30.

Second Embodiment

First, a configuration of an MFP as an electronic device according to a second embodiment of this disclosure will be described.

Figure 10:
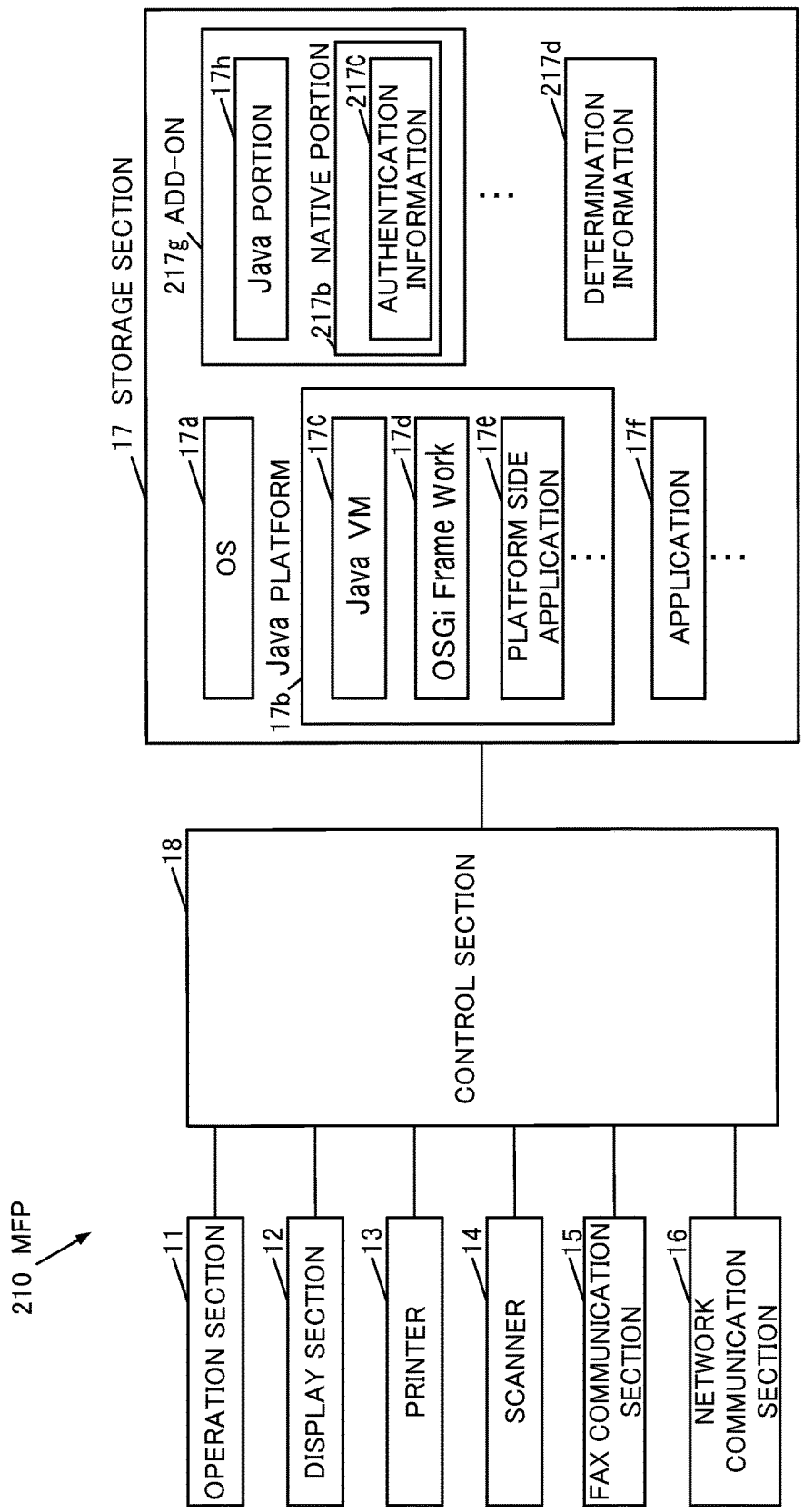
FIG. 10 is a block diagram of an MFP according to a second embodiment of the present disclosure.

FIG. 10 is a block diagram of an MFP 210 according to the present embodiment.

The configuration of the MFP 210 illustrated in FIG. 10 is the same as the configuration of the MFP 10 (see FIG. 1) according to the first embodiment excluding the configuration described below.

The MFP 210 includes not the add-on 17g (see FIG. 1) but an add-on 127a. The add-on 127a includes: a Java portion 17h; and a native portion 217b as a second programming portion which is configured in a native language and called by the Java portion 17h. The MFP 210 includes no authentication information 17j (see FIG. 1) associated with each add-on 17g, and includes authentication information 217c in the native portion 217b.

The MFP 210 includes no determination calculation algorism 17k (see FIG. 1), but includes determination information 217d which is used for determination whether or not the call of the native portion 217b by the Java portion 17h is permitted. That is, as illustrated in FIG. 10, the storage section 17 previously stores the determination information 217d.

Next, creation of an add-on 217a will be described.

Figure 11:
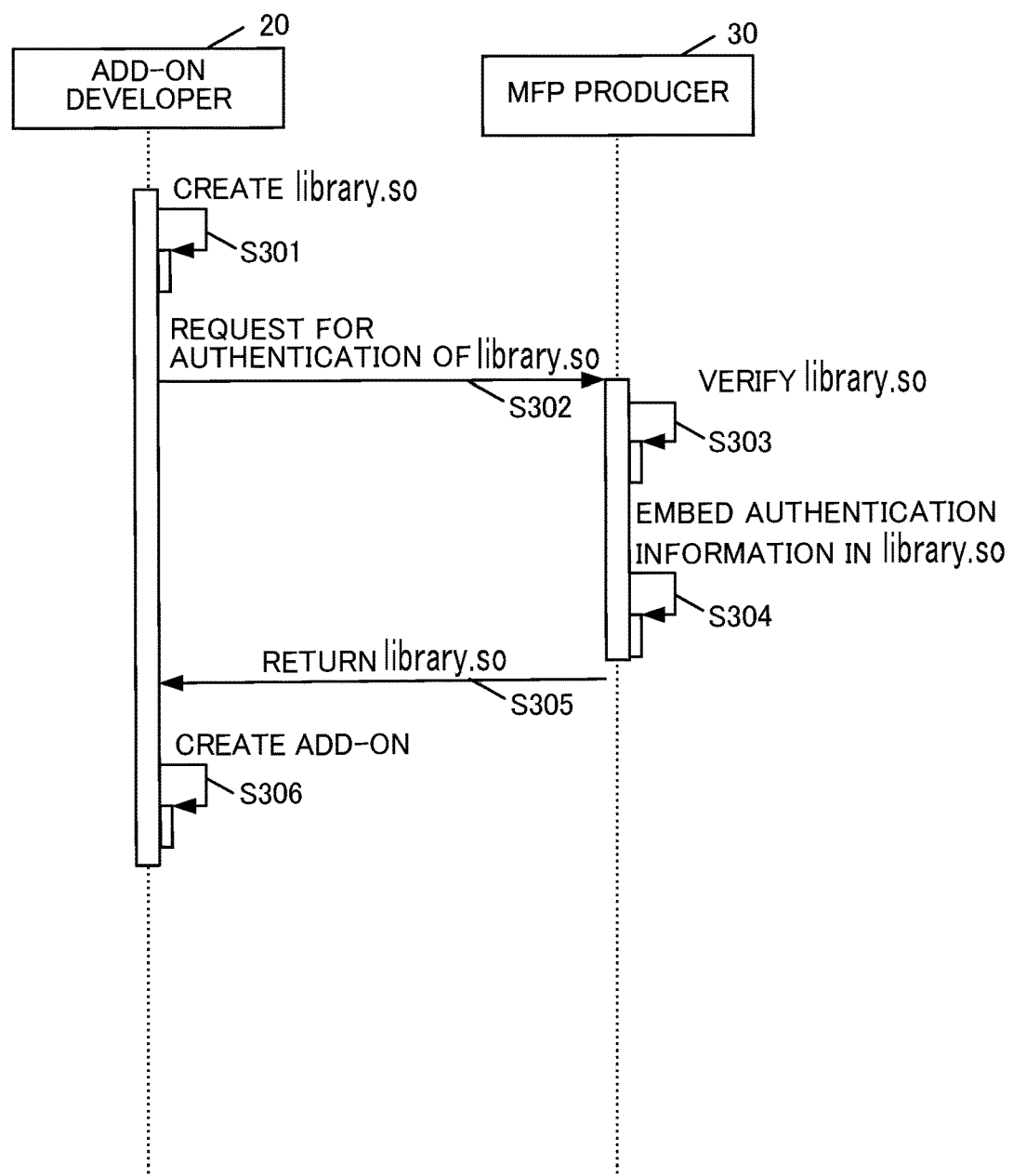
FIG. 11 is a sequence diagram of creation of an add-on illustrated in FIG. 10.

FIG. 11 is a sequence diagram of the creation of the add-on 217a.

As illustrated in FIG. 11, the add-on developer 20 sets, in C++, a portion to be executed in the native by the MFP 210 and creates library. so as a library (S301).

Next, the add-on developer 20 requests the MFP producer 30 for authentication of the library. so created in S301 (S302).

The MFP producer 30 verifies the library. so in accordance with the request made in S302 (S303).

Upon determination that there is no problem with the verification performed in S303, the MFP producer 30 embeds the authentication information 217c in the library. so (S304), and returns, to the add-on developer 20, the library. so in which the authentication information 217c has been embedded (S305).

The add-on developer 20 creates the add-on 217a including the library. so returned in S305, that is, the native portion 217b and the Java portion 17h including a command for loading the library. so (S306).

Next, operation performed by the MFP 210 will be described.

An application 17f created by the application developer is installed into the MFP 210. The add-on 217a created by the add-on developer 20 is also installed into the MFP 210.

First, the operation performed by the MFP 210 upon installation of the add-on 217a will be described.

Figure 12:
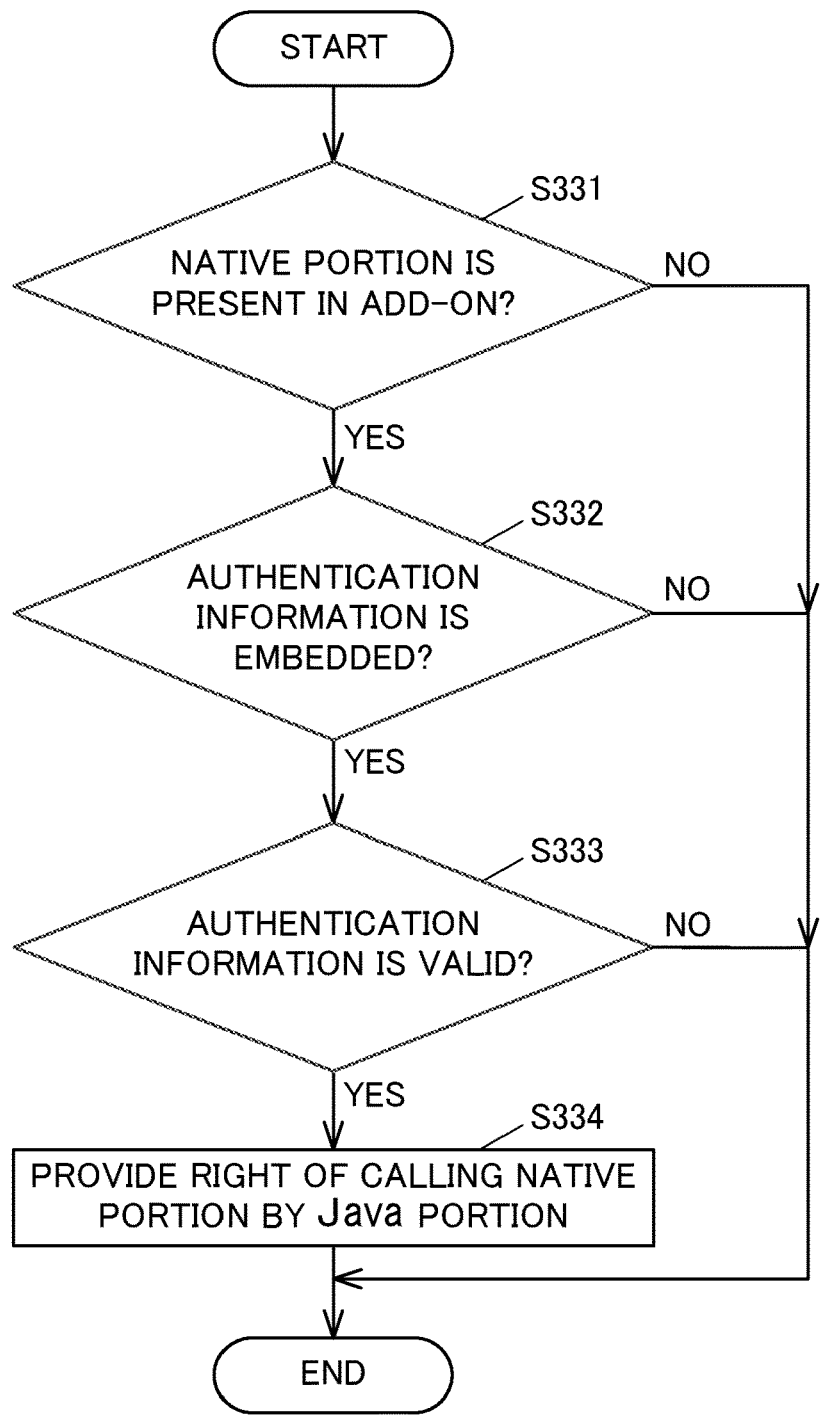
FIG. 12 is a flowchart of operation performed by the MFP illustrated in FIG. 10 upon the add-on installation.

FIG. 12 is a flowchart of the operation performed by the MFP 210 upon the installation of the add-on 217a.

As illustrated in FIG. 12, through execution of a platform side application 17e, the control section 18 determines whether or not the library. so as the native portion 217b is present in the installed add-on 217a (S331).

Upon determination in S331 that the library. so is present, the control section 18 determines whether or not the authentication information 217c is embedded in the library. so (S332).

Through the execution of the platform side application 17e, the control section 18 determines, upon determination in S332 that the authentication information 217c is embedded, whether or not the embedded authentication information 217c is valid, that is, whether or not the call of the native portion 217b by the Java portion 17h is permitted (S333). Here, upon agreement between the authentication information 217c embedded in the library. so of the installed add-on 217a and the determination information 217d (when the authentication information 217c embedded in the library. so of the installed add-on 217a is matched with the determination information 217d), the control section 18 determines that the authentication information 217c is valid.

Upon determination in S333 that the embedded authentication information 217c is valid, that is, the call of the native portion 217b by the Java portion 17h is permitted, the control section 18 provides the installed add-on 217a with a right of calling the native portion 217b by the Java portion 17h, that is, a right of loading the library. so as the native portion 217b in Java execution environment (S334).

Upon determination in S331 that no library. so is present, upon determination in S332 that no authentication information 217c is embedded, upon determination in S333 that the embedded authentication information 217c is not valid, or upon execution of a process of S334, the control section 18 ends the operation illustrated in FIG. 12.

Note that operation performed by the MFP 210 upon the execution of the application 17f is the same as that in the first embodiment.

In the MFP 210 according to the second embodiment of this disclosure, upon determination based on the authentication information 217c that the call of the native portion 217b by the Java portion 17h in the add-on 217a is permitted (YES in S333), the control section 18 provides the add-on 217a with the right of the call (S334), and the add-on 217a is used by the application 17f, thus requiring no association of the authentication information with each application 17f, which makes it easy to create the application 17f.

In the MFP 210 according to one embodiment of this disclosure, the control section 18 maintains the right of calling the native portion 217b by the Java portion 17h even after the execution of the add-on 217a, thus requiring no determination based on the authentication information 217c upon every execution of the add-on 217a, which permits the high-speed call of the native portion 217b by the Java portion 17h.

The control section 18 determines, not upon the execution of the add-on 217a but upon the installation of the add-on 217a, whether or not the call of the native portion 217b by the Java portion 17h is permitted, thus permitting high-seed execution of the add-on 217a. However, the MFP 210 may be configured in a manner such as to determine, not upon the installation of the add-on 217a but upon the initial execution of the add-on 217a, whether or not the call of the native portion 217b by the Java portion 17h is permitted.

The control section 18 stores, in the non-volatile storage section 17, information indicating that the right of calling the native portion 217b by the Java portion 17h is provided and is thereby not required to determine, upon every activation of the MFP 210, whether or not the call of the native portion 217b by the Java portion 17h is permitted, which can reduce process load. However, the MFP 210 may be configured in a manner such as to store, in the RAM of the control section 18, the information indicating that the right of calling the native portion 217b by the Java portion 17h is provided and determine, upon every activation of the MFP 210, whether or not the call of the native portion 217b by the Java portion 17h is permitted.

The authentication information 217c is embedded in the native portion 217b in the present embodiment. However, the authentication information 217c may be included in a portion, other than the native portion 217b, included in the add-on 217a. Moreover, the authentication information 217c may be present as a different file from the add-on 217a in association therewith.

In the MFP 210 according to one embodiment of this disclosure, the storage section 17 previously stores the determination information 217d which is used for the determination whether or not the call of the native portion 217b by the Java portion 17h is permitted. Moreover, upon agreement between the authentication information 217c and the determination information 217d, the control section 18 determines that the call is permitted. With the aforementioned configuration, the MFP 210 can prevent misappropriation of the authentication information validly associated with the specific add-on to another add-on, which improves the security performance.

The MFP producer 30 verifies the library. so in the present embodiment. However, the MFP producer 30 may verify the entire add-on including the library. so.

The electronic device of this disclosure is an MFP in each embodiment described above, but may be an image forming apparatus other than the MFP, such as a print-only device, a copy-only device, a fax-only device, or a scan-only device, or may be an electronic device other than an image forming apparatus, such as a personal computer (PC).

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image forming apparatus comprising:
    an image forming device forming an image on a recording medium;
    a central processing unit (CPU); and
    a storage device storing: a first application; an add-on that includes a Java portion configured in a Java language and a native portion configured in a native language; a second application using the add-on; and determination information used for determining whether or not a call of the native portion by the Java portion is permitted,
    wherein the first application and the second application are Java applications,
    upon an initial execution of the add-on, the CPU executes the first application to, when authentication information associated with the add-on is matched with the determination information, provide the add-on with a right of calling the native portion by the Java portion, and
    the CPU executes the second application to, when the add-on is provided with the right, permit the add-on to use a Java native interface (JNI) and cause the add-on to call the native portion by the Java portion.

2. The image forming apparatus according to claim 1,
    wherein the storage device further stores the authentication information, and
    the CPU executes, upon the initial execution of the add-on, the first application to:
        determine whether or not the add-on includes the native portion;
        when determining that the add-on includes the native portion, determine whether or not the authentication information associated with the add-on is included in the storage device,
        when determining that the authentication information is included in the storage device, determine whether or not the authentication information is matched with the determination information; and
        when determining that the authentication information is matched with the determination information, provide the add-on with the right of calling the native portion by the Java portion.

3. The image forming apparatus according to claim 1, wherein:
    the storage device stores as the determination information a determination calculation algorism; and
    the CPU executes, upon the initial execution of the add-on, the first application to:
        create information from the native portion of the add-on based on the determination calculation algorism; and
        when the information is matched with the authentication information, provide the add-on with the right.

4. The image forming apparatus according to claim 3, wherein:
    the storage device further includes an operating system (OS) and a Java platform operating on the OS;
    the first application is a platform side application included in the Java platform.

5. The image forming apparatus according to claim 4, wherein
    the CPU executes the Java platform to, when the add-on is provided with the right of calling the native portion by the Java portion, cause the add-on to load the native portion in a Java execution environment.

6. The image forming apparatus according to claim 5, wherein the CPU:
    causes the second application to use a function provided by the OS via the add-on;
    causes the add-on to use the JNI for communication with the OS; and
    causes the second application to use the function provided by the Java via the add-on.

7. The image forming apparatus according to claim 1, wherein the CPU executes the second application to, when the add-on is not provided with the right of calling the native portion by the Java portion, not permit the add-on to use the JNI.

8. The image forming apparatus according to claim 1, wherein the native portion includes a native program that executes, when the image forming device forms the image, stapling by an stapler.

* * * * *